US012108200B2

(12) United States Patent
Wang et al.

(10) Patent No.: US 12,108,200 B2
(45) Date of Patent: Oct. 1, 2024

(54) FLEXIBLE SPEAKERS

(71) Applicant: Apple Inc., Cupertino, CA (US)

(72) Inventors: Paul X. Wang, Cupertino, CA (US); Chanjuan Feng, San Jose, CA (US)

(73) Assignee: APPLE INC., Cupertino, CA (US)

( * ) Notice: Subject to any disclaimer, the term of this patent is extended or adjusted under 35 U.S.C. 154(b) by 173 days.

(21) Appl. No.: 17/880,930

(22) Filed: Aug. 4, 2022

(65) Prior Publication Data

US 2023/0055725 A1 Feb. 23, 2023

Related U.S. Application Data

(60) Provisional application No. 63/234,788, filed on Aug. 19, 2021.

(51) Int. Cl.
*H04R 1/02* (2006.01)
*H04R 7/02* (2006.01)

(52) U.S. Cl.
CPC ............... *H04R 1/028* (2013.01); *H04R 7/02* (2013.01); *H04R 2499/15* (2013.01)

(58) Field of Classification Search
CPC ....... H04R 1/028; H04R 7/02; H04R 2499/15
USPC .......................................................... 381/388
See application file for complete search history.

(56) References Cited

U.S. PATENT DOCUMENTS 10,070,228 B2 9/2018 Wang et al.
10,694,284 B2 6/2020 Wilk et al.
2002/0126867 A1 9/2002 Aizik
2013/0163807 A1 6/2013 Lin
2016/0154437 A1 6/2016 Kim et al.
2018/0045982 A1* 2/2018 Fan ....................... G10K 11/002
2021/0168554 A1* 6/2021 Zhang ................... H04M 1/035

OTHER PUBLICATIONS

Lin, Jium-Ming, et al., "A low cost flexible electro-dynami planar loudspeaker", JVE Intl. Ltd. Journal of Vibroengineering, May 2016, vol. 18, Issue 3, ISSN 1392-8716, https://www.researchgate.net/publications/303292220 (9 pp).
Lin, Jium-Ming, et al., "A novel flexible planar loudspeaker with coils on polyimide diaphragm", JVE Intl. Ltd. Journal of Vibroengineering, Feb. 2018, vol. 20, Issue 1, ISSN 1392-8716, https://www.jvejournals.com/article/18923 (8 pp).
International Search Report and Written Opinion mailed Dec. 19, 2022, in Intl App No. PCT/US2022/038454 (21 pp).

* cited by examiner

*Primary Examiner* — Sean H Nguyen
(74) *Attorney, Agent, or Firm* — Young Basile Hanlon & MacFarlane, P.C.

(57) ABSTRACT

A speaker includes a housing having walls that define a cavity and a diaphragm covering the cavity and configured to vibrate under application of a magnetic field. The vibration produces sound waves. The walls are configured to deform under bending stress. The speaker is configured produce the sound waves both in an undeformed state and in a deformed state. Another speaker includes a flexible layer, a sensor configured to detect a curvature of the flexible layer, and a transducer disposed on and configured to vibrate the flexible layer. The vibrations of the flexible layer generate sound waves and output generated by the transducer is based on the curvature of the flexible layer.

25 Claims, 5 Drawing Sheets

FLEXIBLE SPEAKERS

CROSS-REFERENCE TO RELATED APPLICATION(S)

This application claims the benefit of U.S. Provisional Patent Application No. 63/234,788, filed on Aug. 19, 2021, the content of which is hereby incorporated by reference in its entirety for all purposes.

TECHNICAL FIELD

This disclosure relates generally to speakers and specifically to speakers with flexible components for use in consumer electronics.

BACKGROUND

Consumer electronics are designed in a variety of shapes and sizes with versatility becoming increasingly important in an ever-connected environment. Speakers are typically included with consumer electronics such as head-mounted displays, headphones, smart phones, smart watches, laptops, or other wearable devices. Packaging such speakers can be difficult and is driven by the size, shape, and audio capabilities of both the speaker and the electronic device within which the speaker is integrated.

SUMMARY

A first aspect of the disclosed embodiments is a speaker. The speaker includes a housing having walls that define a cavity, an electromagnet disposed in the cavity and configured to selectively generate a first magnetic field, a permanent magnet disposed in the cavity and configured to generate a second magnetic field, and a diaphragm configured to vibrate during interaction of the first and second magnetic fields to produce sound waves. The walls, the magnets, and the diaphragm are flexible and configured to deform together.

In the first aspect, the speaker may include a reinforcement extending between the walls at a location in the cavity external to the magnets, and the reinforcement may be configured to prohibit the walls, the magnets, and the diaphragm from contacting each other during deformation. The speaker may include a back volume disposed between the walls at a location in the cavity external to the reinforcement and the reinforcement may define perforations configured to allow air to flow into and out of the back volume. The speaker may include ribs disposed at spaced locations in the back volume, each rib extending from one wall toward another wall in an alternating manner, the ribs forming a circuitous flow path for air generated during vibration of the diaphragm. The speaker may include a sensor configured to detect a magnitude of deformation of at least one of the walls, the magnets, or the diaphragm. A magnitude of the first magnetic field may be based on the magnitude of deformation detected with the sensor. A pattern of current supplied to the electromagnet may be modified based on the magnitude of deformation detected with the sensor. The various features of the first aspect described in this paragraph can be implemented together or separately.

A second aspect of the disclosed embodiments is a speaker. The speaker includes a housing having walls that define a cavity and a diaphragm covering the cavity and configured to vibrate under application of a magnetic field. The vibration produces sound waves. The walls are configured to deform under bending stress, and the speaker is configured produce the sound waves both in an undeformed state and in a deformed state.

In the second aspect, the walls may comprise wall sections and respective contiguous wall sections may be coupled by hinges that are compressed in the deformed state and expanded in the undeformed state. The speaker may include an electromagnet disposed in the cavity and configured to selectively generate the magnetic field and a permanent magnet disposed in the cavity and configured to generate another magnetic field. The diaphragm may vibrate during interaction of the magnetic fields. The speaker may include a sensor configured to detect a magnitude of deformation of at least one of the walls. A pattern of current supplied to the electromagnet may be modified based on the magnitude of deformation detected with the sensor. A magnitude of the magnetic field selectively generated by the electromagnet may be based on the magnitude of deformation detected with the sensor. The speaker may include a back volume disposed between the walls at a location external to the diaphragm. The speaker may include ribs disposed at spaced locations in the back volume, each rib extending from one wall toward another wall in an alternating manner, and the ribs forming a circuitous flow path for air generated during vibration of the diaphragm. The various features of the second aspect described in this paragraph can be implemented together or separately.

A third aspect of the disclosed embodiments is a head-mounted display. The head-mounted display includes a head support and a speaker disposed in the head support. The speaker includes a housing defining a cavity and a diaphragm covering the cavity and configured to vibrate under application of a magnetic field. The vibration produces sound waves. The head support and the housing of the speaker are configured to deform under bending stress. The speaker is configured produce the sound waves both in an undeformed state and in a deformed state.

In the third aspect, the head-mounted display may include an electromagnet disposed in the cavity and configured to selectively generate the magnetic field and a permanent magnet disposed in the cavity and configured to generate another magnetic field. The diaphragm vibrates during an interaction between the magnetic fields to produce the sound waves. The head-mounted display may include a sensor disposed in the head support, the sensor configured to detect a magnitude of deformation of at least one of the housing of the speaker or the head support. A pattern of current supplied to the electromagnet may be modified based on the magnitude of deformation detected with the sensor. A magnitude of the magnetic field selectively generated by the electromagnet may be based on the magnitude of deformation detected with the sensor. The various features of the third aspect described in this paragraph can be implemented together or separately.

A fourth aspect of the disclosed embodiments is a speaker. The speaker includes a flexible layer, a sensor configured to detect a curvature of the flexible layer, and a transducer disposed on and configured to vibrate the flexible layer. The vibrations of the flexible layer generate sound waves. Output generated by the transducer is based on the curvature of the flexible layer.

In the fourth aspect, the flexible layer may be part of a display formed from one or more of glass, polymer, or liquid crystal. The flexible layer, the transducer, or both may deform under bending stress such that the speaker is configured to produce the sound waves both in an undeformed state and in a deformed state. A pattern of vibrations produced by the transducer may be modified based on the curvature detected with the sensor. The various features of the fourth aspect described in this paragraph can be implemented together or separately.

DETAILED DESCRIPTION

Speakers with flexible components can support ease of integration and improved conformability in a variety of electronic devices such as head-mounted displays, laptops, smart phones, or wearable devices. In some examples, components such as magnets, diaphragms, and walls of a housing of a speaker can be flexible and operable in various folded, bent, or curved configurations. In other examples, walls of a speaker can include sections coupled by hinges that allow flexibility or deformation of portions of the speaker. In other examples, a speaker can be formed from a flexible substrate and transducers. The flexible speakers described herein can be implemented in a variety of consumer devices to take advantage of limited packaging space and achieve improved deformability of the consumer device.

Figure 1A:
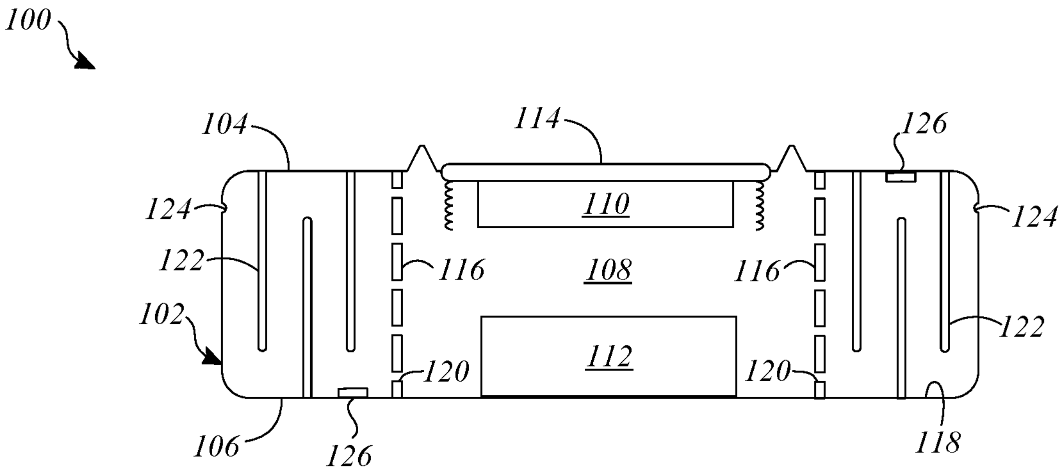
FIG. 1A is a schematic sectional view through a speaker.
Figure 1B:
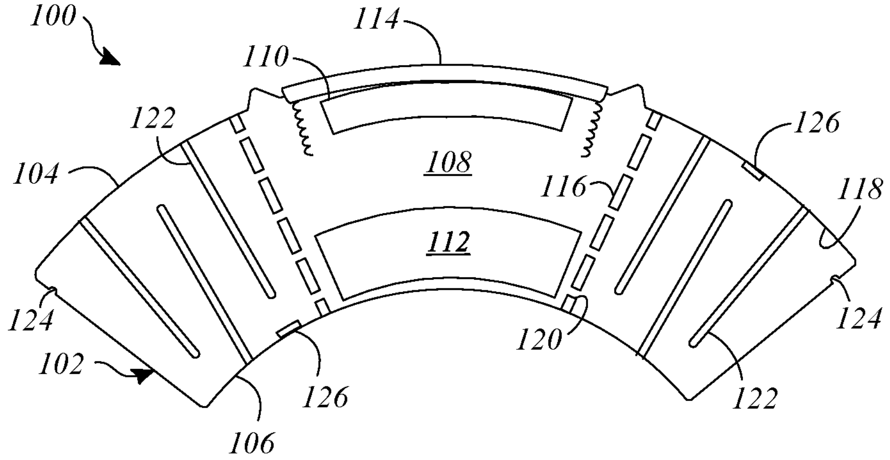
FIG. 1B is a schematic sectional view through the speaker of FIG. 1A with the speaker in a deformed state.

FIGS. 1A and 1B show schematic sectional views through a speaker 100. In FIG. 1A, the speaker 100 is shown in an undeformed state, that is, components within the speaker 100 are not bent, deformed, or flexed. In FIG. 1B, the speaker 100 is shown in a deformed state, that is, multiple components within the speaker 100 are deformed, bent, or flexed, and a shape of the speaker 100 is changed as compared to FIG. 1A.

The speaker 100 includes a housing 102 having walls 104, 106 that define a cavity 108. The walls 104, 106 of the housing 102 can be formed from flexible materials, such as rubber, elastomers, polymers, thin metals, or other materials suitable to allow the speaker 100 to deform between the undeformed state shown in FIG. 1A and the deformed state shown in FIG. 1B. Though the undeformed state shown in FIG. 1A shows straight, parallel walls 104, 106, the undeformed state may optionally include some curvature, bend, or deformation in the walls 104, 106 without departing from the scope of this invention. The speaker 100 is thus configured to deform, bend, curve, or otherwise flex to allow changes in shape and position of the walls 104, 106 between the undeformed state and the deformed state. Intermediate positions of the walls 104, 106 are also possible. The housing 102 and the walls 104, 106 may be absent in some embodiments, for example, where the components of the speaker 100 are integrated within another device and portions of the other device serve as the housing 102 and the walls 104, 106 of the speaker 100. In some embodiments, additional walls (not shown) can couple the walls 104, 106 such that the cavity 108 is enclosed on four sides.

The speaker 100 includes an electromagnet 110 disposed in the cavity 108 and configured to selectively generate a first magnetic field, for example, based on current supplied to a coil. The generation of the first magnetic field is selective in that it can be varied in timing, intensity, on/off pattern, etc. in order to support the speaker 100 generating sound. The speaker 100 also includes a permanent magnet 112 disposed in the cavity 108 within a range of the first magnetic field. The permanent magnet 112 can be magnetized with a N-S polarity and configured to generate a second magnetic field that interacts with the selectively applied first magnet field. The magnets 110, 112 can be flexible components formed, for example, from rubber or polymer doped with neodymium, alnico, ceramic particulates, etc.

The speaker 100 includes a diaphragm 114 configured to vibrate during interaction of the first and second magnetic fields to produce sound waves (not shown). The diaphragm 114 is shown positioned over or above the cavity 108 and adjacent or next to the electromagnet 110 and includes hill-shaped or cone-shaped edge features between the diaphragm 114 and the wall 104 that allow the diaphragm 114 to more easily vibrate based on the interaction of the first and second magnetic fields to produce the sound waves consistent with audio function of the speaker 100. In the example of FIGS. 1A and 1B, the walls 104, 106, the magnets 110, 112, and the diaphragm 114 are flexible and configured to deform together, for example, in response to bending stress applied to the housing 102 and as shown by comparing the shape of the housing 102, the walls 104, 106, the magnets 110, 112, and the diaphragm 114 in FIGS. 1A and 1B. The ability of the speaker 100 to bend or flex allows for unobtrusive integration of the speaker 100 into various products such as clothing, backpacks, watches, head-mounted displays (not shown) or other products to both conserve packaging space and increase comfort.

The speaker 100 includes a reinforcement 116 extending between the walls 104, 106 at a location in the cavity 108 external to the magnets 110, 112. The reinforcement 116 is configured to prohibit the walls 104, 106, the magnets 110, 112, and the diaphragm 114 from contact with each other during deformation. In other words, the reinforcement 116 can form a rigid connection between the walls 104, 106 that prevents the walls 104, 106 from collapse or compression during bending. In another example, the reinforcement 116 can be formed from materials that are stiffer than the materials used to form the walls 104, 106 of the housing 102 such that the reinforcement 116 provides the support required to avoid compression of the cavity 108. This support is important to maintain function of the speaker 100 as shape modifications can impact sound quality.

The speaker 100 can include a back volume 118 disposed between the walls 104, 106 at a location in the cavity 108 external to the reinforcement 116. The reinforcement 116 can define perforations 120 configured to allow air to flow into and out of the back volume 118 from the cavity 108 during operation of the speaker 100. The speaker 100 can include ribs 122 disposed at spaced locations in the back volume 118. Each of the ribs 122 extends from one of the walls 104, 106 toward the other of the walls 104, 106 in an alternating manner. In this way, the ribs 122 form a circuitous flow path for air generated during vibration of the diaphragm 114. The ribs 122 can be rigid, structural, or otherwise less flexible than the walls 104, 106 to maintain the flow path during bending or deformation of the speaker 100. In an embodiment where additional walls (not shown)

couple the walls 104, 106 to enclose the cavity 108, the ribs 122 can also extend between the additional walls such that air is forced through the circuitous flow path.

The speaker 100 may include ports 124 that allow air to flow into and out of the housing 102 at ends of the circuitous flow paths established by the ribs 122 in the back volume 118. The use of ports 124 is beneficial when a larger size or a higher level of bass is desired, such as in a woofer-type speaker, but may not be needed, for example, in cases where a smaller size or a higher level of treble is useful, such as with a tweeter-type speaker. Though the ports 124 are shown as small openings, a size of the ports 124 may be larger to facilitate entry and exit of air from the housing 102.

The ribs 122 supplement the reinforcement 116 in controlling a shape of the speaker 100 while directing airflow through the housing 102. That is, the ribs 122, though extending only partially across a distance between the walls 104, 106, can keep the walls 104, 106 and hence the cavity 108 from compression or collapse during deformation. The ribs 122 further combat compression and collapse in examples where additional walls (not shown) couple the walls 104, 106 and the ribs 122 extend between the additional walls. The use of a lengthened flow path as shown extending from the cavity 108, through the perforations 120 in the reinforcement 116, around the ribs 122, and out of the ports 124 allows for improved frequency control, especially at low frequencies, to improve acoustic performance of the speaker 100.

The speaker 100 can include a sensing system configured to detect a magnitude of deformation of at least one of the walls 104, 106, the magnets 110, 112, or the diaphragm 114. The sensing system can include, for example, sensors 126 with various capabilities to determine a shape of the speaker 100, such as whether the speaker is in the undeformed state of FIG. 1A, the deformed state of FIG. 1B, or an intermediate state (not shown). For example, the sensors 126 can include angular, inertial, or gyroscopic capabilities to determine an orientation of the walls 104, 106. The sensors 126 can include hall-effect or volumetric capabilities to determine shapes or sizes of the back volume 118, the cavity 108, or the diaphragm 114. The sensors 126 can include pressure or barometric capabilities to detect pressure differences indicative of deformation or volumetric change occurring within the cavity 108 or the back volume 118. The sensors 126 can include impedance capabilities such that volume or shape changes to the speaker 100 drive impedance curve changes.

Based on changes in shape of the speaker 100 detected by the sensing system, the speaker 100 can be configured to implement changes in mode, output, or operation. For example, information from the sensors 126 can be sent to a controller (not shown) associated with the sensing system. A magnitude of the first magnetic field can be modified or otherwise determined based on a magnitude of deformation detected with the sensing system. In another example, a pattern of current supplied to the electromagnet 110 can be modified based on a magnitude of deformation detected with the sensing system. The term "pattern" is used to indicate features such as frequency, intensity, or amplitude associated with application of current to the electromagnet 110. In other words, vibration of the diaphragm 114 can be varied based on whether the speaker 100 includes flexed, bent, or otherwise deformed walls 104, 106 or magnets 110, 112 to maintain performance regardless of shape.

The speaker 100 of FIGS. 1A and 1B can be manufactured using a molding process, such as overmolding or compression molding, to better control build tolerances and attain flexibility. For example, a fixture or jig can be designed to receive the magnets 110, 112, the diaphragm 114, the reinforcement 116, the ribs 122, and/or the sensors 126 to allow the walls 104, 106 of the housing 102 to be formed around these components in a desired arrangement. The cavity 108 and the back volume 118 can be formed using inserts or spacers within the mold, fixture, or jig. One benefit of this process is that polymers, such as silicone, rubbers, or other moldable materials can be used to form the housing 102 to provide flexibility and to improve vibration dampening of the overall speaker 100. That is, when the diaphragm 114 vibrates, the housing 102 can dampen this vibration based on the use dampening materials to form the walls 104, 106. A material stiffness and geometry of the housing 102 can be tuned for resonance at a lower frequency than operational frequency of the speaker 100. Another benefit of this manufacturing process is that separate dampening mechanisms, such as foams, may not be required for integration of the speaker 100 into another device, such as a head-mounted display.

Figure 2:
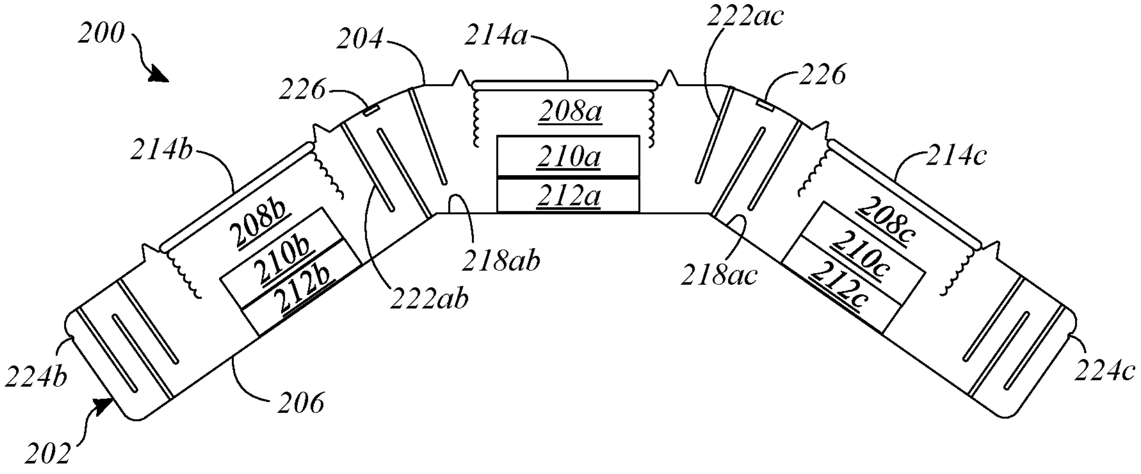
FIG. 2 is a schematic sectional view through another speaker.

FIG. 2 is a schematic sectional view through a speaker 200. The speaker 200 has multiple sections and components of a given section are denoted using the letters "a," "b," and "c." The sections are deformable, bendable, or flexible in respect to other sections of the speaker 200. The speaker 200 includes a housing 202 having walls 204, 206 that define cavities 208*a,b,c*. The walls 204, 206 of the housing 202 can be formed from flexible materials, such as rubber, elastomers, polymers, thin metals, or other materials suitable to allow the speaker 200 to deform, bend, or flex at locations between, for example, the cavities 208*a,b* and the cavities 208*a,c*. The housing 202 and the walls 204, 206 may be absent in some embodiments, for example, where the components of the speaker 200 are integrated within another device and portions of the other device serve as the housing 202 and the walls 204, 206 of the speaker 200. In some embodiments, additional walls (not shown) can couple the walls 204, 206 such that the cavities 208*a,b,c* are enclosed on four sides. Only a deformed state for the speaker 200 is shown in FIG. 2, but the walls 204, 206 may be straightened or bent to other angles to achieve an undeformed state (not shown). The speaker 200 is thus configured to deform, bend, or otherwise flex between the undeformed state and the deformed state.

The speaker 200 includes electromagnets 210*a,b,c* disposed in respective cavities 208*a,b,c* and configured to selectively generate magnetic fields, for example, based on current supplied to coils. The speaker 200 also includes permanent magnets 212*a,b,c* disposed in respective cavities 208*a,b,c* within a range of the respective magnetic fields. The permanent magnets 212*a,b,c* can be magnetized with N-S polarities and configured to generate additional magnetic fields that interact with the selectively applied magnetic fields of the respective electromagnets 210*a,b,c*.

The speaker 200 includes diaphragms 214*a,b,c* configured to vibrate during interaction of the respective magnetic fields produced by the electromagnets 210*a,b,c*, 212*a,b,c* to produce sound waves (not shown). The diaphragms 214*a,b,c* are shown positioned over or above respective cavities 208*a,b,c*, adjacent or next to respective electromagnets 210*a,b,c*, and include hill-shaped or cone-shaped edge features between the diaphragms 214*a,b,c* and the wall 204 that allow the diaphragms 214*a,b,c* to more easily vibrate based on the interaction of the respective magnetic fields to produce the sound waves consistent with audio function of the speaker 200. Though shown as generally the same size, the magnets 210*a,b,c*, 212*a,b,c* and the diaphragms 214*a,b,c* could differ in size consistent with each section of the speaker 200 being dedicated to a predetermined frequency range for a richer sound performance. In other words, the diaphragm 214*a* and the magnets 210*a*, 212*a* could be designed in a larger size for use in providing lower frequency sound waves and the diaphragm 214*c* and the magnets 210*a*, 212*c* could be designed in a smaller size for use in providing higher frequency sound waves.

The speaker 200 includes back volumes 218*ab,ac* disposed between the walls 204, 206 and between the cavities 208*a,b* and 208*a,c* at locations external to the diaphragms 214*a,b,c*. The walls 204, 206 are flexible and configured to conform at a location of the back volumes 218*ab,ac* to change a shape of the speaker 200. The speaker 200 can include structural ribs 222*ab,ac* disposed at spaced locations in the respective back volumes 218*ab,ac*. Each of the ribs 222*ab,ac* extends from one of the walls 204, 206 toward the other of the walls 204, 206 in an alternating manner. In this way, the ribs 222*ab,ac* form a circuitous flow path for air generated during vibration of the diaphragms 214*a,b,c*. The ribs 222*ab,ac* can also prevent the back volumes 218*ab,ac* from collapse during deformation or bending. The ability of the speaker 200 to share the back volumes 218*ab,ac* between elements and to bend at a location of the back volumes 218*ab,ac* allows the speaker 200 to be integrated into various products such as clothing, backpacks, watches, head-mounted displays (not shown) or other products that have constraints on packaging space or goals to increase comfort for the user in a wearable product.

The speaker 200 may include ports 224*b,c* that allow air to flow into and out of the housing 202. The use of ports 224*b,c* improves airflow, for example, if a higher level of bass is desired, such as in a woofer-type speaker, but may not be needed, for example, in cases where a higher level of treble is desired, such as in a tweeter-type speaker. Though the ports 224*b,c* are shown as small openings, a size of the ports 224*b,c* may be larger to allow easier entry and exit of air from the housing 202. Additional ports (not shown) may be located, for example, along the walls 204, 206 proximate to the back volumes 218*ab,ac*.

The speaker 200 can include a sensing system configured to detect a magnitude of deformation of at least one of the walls 204, 206 or the ribs 222*ab,ac* of the speaker 200. The sensing system can include sensors 226 with various capabilities to determine a shape or position of the walls 204, 206 or the ribs 222*ab,ac*. For example, the sensing system can include angular, inertial, or gyroscopic capabilities to determine an orientation of the walls 204, 206 or the ribs 222*ab,ac*. The sensors 226 can include hall-effect or volumetric capabilities to determine shapes or sizes of the back volumes 218*ab,ac*. The sensors 226 can include pressure or barometric capabilities to detect whether deformation or volumetric change occurs within the back volumes 218*ab,ac*. The sensors 226 can include impedance capabilities such that volume or shape changes to the speaker 200 drive impedance curve changes.

Based on changes in shape detected for at least one of the back volumes 218*ab,ac* of the speaker 200, the speaker 200 can be configured to implement changes in mode, output, or operation. For example, information from the sensors 226 can be sent to a controller (not shown) associated with the sensing system. Patterns of current supplied to at least one of the electromagnets 210*a,b,c* can be modified based on a magnitude of deformation detected using the sensing system. In another example, a magnitude of the magnetic field selectively generated by at least one of the electromagnets 210*a,b,c* can be based on a magnitude of deformation detected using the sensing system. In other words, vibration of the diaphragms 214*a,b,c* can be varied based on whether portions of the speaker 200 include flexed, bent, or otherwise deformed walls 204, 206 to maintain performance of the speaker 200 regardless of shape. The speaker 200 of FIG. 2 can be manufactured using a process similar to that described in respect to the speaker 100 of FIGS. 1A and 1B.

Figure 3A:
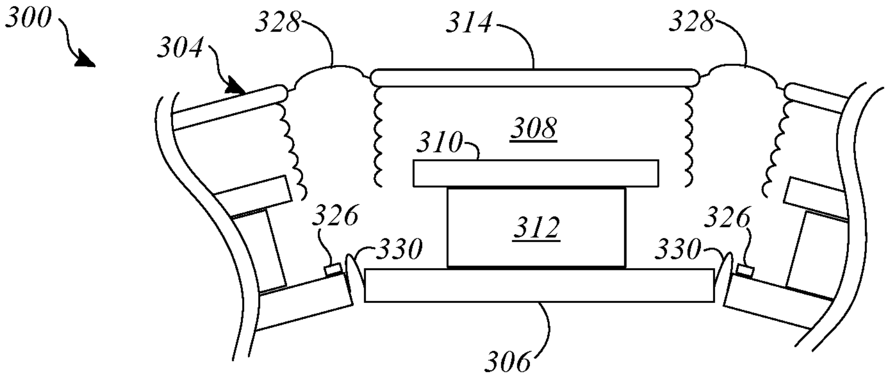
FIG. 3A is a schematic sectional view through another speaker in a deformed state.
Figure 3B:
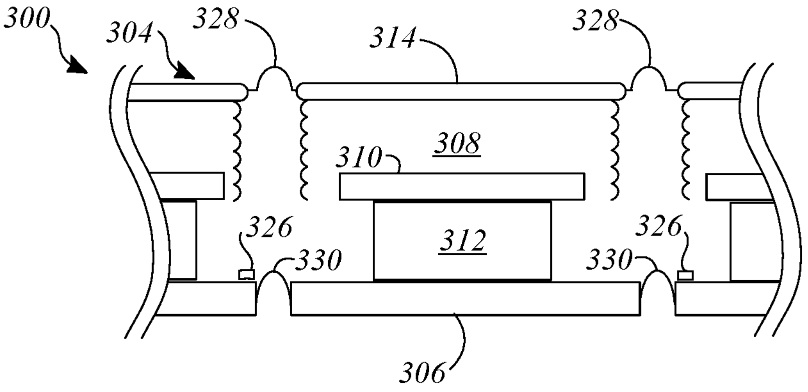
FIG. 3B is a schematic sectional view through the speaker of FIG. 3A with the speaker in an undeformed state.

FIG. 3A is a schematic sectional view through another speaker 300 in a deformed or folded state. FIG. 3B is a schematic sectional view through the speaker 300 of FIG. 3A in an undeformed or unfolded state. In this example, the speaker 300 may be non-operable in the deformed of folded state of FIG. 3A and operable in the undeformed or unfolded state of FIG. 3B. The speaker 300 can be packaged within or proximate to a portion of a component that folds open and closed, such as a hinge between a screen and a keyboard of a laptop or a smart phone. Edges of the speaker 300 are truncated, and only a central portion of the speaker 300 is described.

The speaker 300 includes walls 304, 306 that define a cavity 308. The walls 304, 306 can be formed from rigid components coupled with flexible components to provide predetermined areas along the walls 304, 306 that bend or flex. The walls 304, 306 may be absent in some embodiments, for example, where the components of the speaker 300 are integrated within another device and portions of the other device serve as the walls 304, 306 of the speaker 300. In some embodiments, additional walls (not shown) can couple the walls 304, 306 such that the cavity 308 is enclosed on four sides. The speaker 300 includes an electromagnet 310 disposed in the cavity 308 and configured to selectively generate a magnetic field, for example, based on current supplied to coils. The speaker 300 also includes a permanent magnet 312 disposed in the cavity 308 within a range of the magnetic field. The permanent magnet 312 can be magnetized with a N-S polarity and configured to generate another magnetic field that interacts with the selectively applied magnet field of the electromagnet 310.

The speaker 300 includes a diaphragm 314 configured to vibrate during interaction of the magnetic fields produced by the magnets 310, 312 to produce sound waves (not shown). The diaphragm 314 is shown positioned above the cavity 308. The diaphragm 314 can be coupled to the remainder of the wall 304 of the speaker 300, or to additional portions of the diaphragm 314, using hinges 328. The hinges 328 can be formed, for example, of flexible, foldable, or otherwise deformable materials such as thin metals, springs, or polyurethane and have generally hill-shaped or cone-shaped bodies to allow the diaphragm 314 to more easily vibrate based on the interaction of the respective magnetic fields to produce the sound waves consistent with audio function of the speaker 300.

The wall 306 of the speaker 300 can also be segmented or portioned as shown in FIGS. 3A and 3B. The segments or portions of the wall 306 can be coupled to each other using hinges 330. The hinges 330 can include rotational components with stops or detents (not shown), springs, or other deformable components that are configured for both bending under higher levels of bending stress and maintaining shape under lower levels of bending stress. In other words, the walls 304, 306 of the speaker 300 comprise wall sections, and respective contiguous wall sections 304, 306 are coupled by the flexible hinges 328, 330 that can be compressed in the deformed state as shown in FIG. 3A and expanded in the undeformed state as shown in FIG. 3B. The ability of the speaker 300 to bend or flex using the hinges 328, 330 allows the speaker 300 to be integrated into various products such as laptops, smart phones, head-mounted displays (not shown), or other products that have designed folding portions or other constraints on packaging space.

The speaker 300 can include a sensing system configured to detect a magnitude of deformation of at least one of the hinges 328, 330. The sensing system can include sensors 326 with various capabilities to determine positions of or stresses experienced by the hinges 328, 330. For example, the sensing system can include angular, inertial, or gyroscopic capabilities to determine an orientation of the hinges 328, 330. The sensors 326 can include strain gauge capabilities to detect deformation or compression in the hinges 328, 330. The sensors 326 can include pressure or barometric capabilities to detect whether deformation or volumetric change occurs within the cavity 308 based on compression or decompression of the hinges 328, 330. The sensors 326 can include impedance capabilities such that shape changes to the speaker 300 drive impedance curve changes.

Based on a shape or position of the hinges 328, 330 or a level of stress or strain detected in the hinges 328, 330, the speaker 300 can be configured for operation. For example, information from the sensors 326 can be sent to a controller (not shown) associated with the sensing system. A decision whether to supply current to the electromagnet 310 can be made based on a position of or stress experienced by at least one of the hinges 328, 330. In other words, a decision whether to vibrate the diaphragm 314 can based on whether portions of the speaker 300 include flexed, bent, folded, or otherwise deformed hinges 328, 330 in order to restrict operation of the speaker 300 to conditions where the cavity 308, the magnets 310, 312, and the diaphragm 314 are oriented for intended operation of the speaker 300.

Figure 4A:
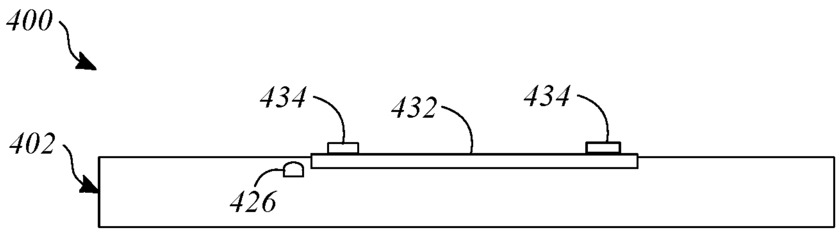
FIG. 4A is a schematic sectional view through another speaker.
Figure 4B:
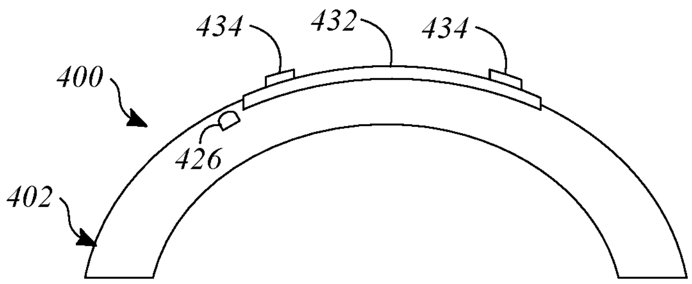
FIG. 4B is a schematic sectional view through the speaker of FIG. 4A with the speaker in a deformed state.

FIG. 4A is a schematic sectional view through another speaker 400 in an undeformed, unbent, or unflexed state. FIG. 4B is a schematic sectional view through the speaker 400 of FIG. 4A in a deformed, bent, or flexed state. The speaker 400 includes a flexible layer 432 disposed on or otherwise coupled to a housing 402, a sensor 426 that is part of a sensing system configured to detect a curvature of the flexible layer 432 or the housing 402, and/or one or more transducers 434 disposed on and configured to vibrate the flexible layer 432. The vibrations of the flexible layer 432 can project sound waves to allow the combination of the transducer(s) 434 and the flexible layer 432 to function as the speaker 400.

The housing 402 can be formed from flexible materials, such as polymers, fabrics, composites, or other materials suitable for use, for example, as a strap of a wrist-worn device, a headband or temple of a head-mounted device, or a strap of a bag or a backpack. The material of the housing 402 is configured to support the flexible layer 432 while allowing the flexible layer 432 to curve, bend, or flex. The housing 402 may be absent in some embodiments, that is, a portion of another device may support or include the flexible layer 432. The flexible layer 432 can be part of a display or a cover for a display (not shown) that is formed from one or more of glass, polymer, or liquid crystal. The display (not shown) can be configured to show visual content to a user in both the flat, unbent, undeformed configuration or state such as that shown in FIG. 4A and the curved, flexed, bent, or deformed configuration or state such as that shown in FIG. 4B. The flexible layer 432 can also be designed without display or other electronic capabilities.

The sensor 426 can be configured to determine a curvature of the flexible layer 432, for example, using angular measurement or inertial measurement. The sensor 426 can be configured to detect changes to impedance that occur during operation of the flexible layer 432 or the transducer(s) 434, or the sensor 426 can implement other sensing capabilities. Either or both of the flexible layer 432 and the transducer(s) 434 can be configured to deform under bending stress such that the speaker 400 is configured to project sound waves both in an unbent, flat, or undeformed state as shown in FIG. 4A and in a curved, bent, or deformed state as shown in FIG. 4B. An output level of the transducer(s) 434 can be based on the curvature of the flexible layer 432. In other words, a pattern or timing of vibrations produced by the transducer(s) 434 can be modified based on a curvature of the flexible layer 432 an/or the transducer(s) 434 detected with the sensor 426 of the sensing system.

The transducer(s) 434 can be used to effect sound waves, for example, based on a controller sending a command to modulate an audio signal onto the flexible layer 432 that acts as a carrier, then the audio signal can be amplified and projected into an environment surrounding the housing 402 by the transducer(s) 434. The use of the flexible layer 432 and the transducer(s) 434 allows for low-profile, directionally-focused sound that can be provided using a common surface, that is, the flexible layer 432 serving, in some examples, as part of a display (not shown). The speaker 400 is thus compatible with providing a personal audio (and optionally, visual) experience that can be implemented in a variety of wearable devices that would benefit from use of little packaging space while providing flexibility.

For example, any of the speakers 100, 200, 300, 400 of FIGS. 1A to 4B can be used with a head-mounted display (not shown). The head-mounted display can be shaped to fit heads of different users and components such as a display unit and/or a head support of the head-mounted display may be configured to bend, stretch, fold, or otherwise deflect to fit the heads of different users. The head-mounted display can be worn on heads of users, display graphic or visual content to the users, and generate audio content for projection to the users, for example, using speakers, such as the speakers 100, 200, 300, 400, located within the head-mounted display. The graphic content can be associated with computer-generated reality or augmented reality. The audio content can be associated with the graphic content.

The display unit can include a housing and one or more display screens such as liquid crystal display(s) (LCD), organic light-emitting diodes (OLED), or other display types that can display light to eyes of the users or project light onto a reflector (e.g., a lens) to be reflected to the users. For example, the display unit can include or otherwise project to a screen or lenses configured to align with eyes of the users wearing the head-mounted display.

The head support of the head-mounted display can engage various shapes and sizes of heads of users to support the display unit and the speakers on the heads of the users. The head support may, for example, be configured as a multi-piece support or may include a strap or band that extends rearward of the display unit along sides and backs of the heads of the users. The head support may, for example, include or be made of one or more flexible and/or elastic materials. For example, the head support may be formed of a rubber or other polymeric material suitable to seal electrical components of the head-mounted display and the speakers therein and may change shape to conform to varied head shapes of users. Such electrical components may, for example, be coupled to a flexible circuit board contained (e.g., sealed within) the rubber or other polymeric material.

One or more speakers, such as the speakers 100, 200, 300, 400 of FIGS. 1A to 4B, may be disposed within the head support. The speakers can include housings that are flexible, deformable, bendable, or otherwise malleable in a manner consistent with a change in shape of the head support of the head-mounted display. For example, in one configuration, the shape of the head support may be suitable for a user with a smaller, shorter, or narrower head. In another configuration, the shape of the head support may be suitable for another user with a larger, wider, or longer head.

When disposed in the head support, the one or more speakers can move, bend, or otherwise deform using features consistent with features of the speakers 100, 200, 300, 400 of FIGS. 1A to 4B to provide audio content to the user(s) of the head-mounted display regardless of the shape of the head support. In other words, both the head support and the speakers (e.g., the housing, the magnets, the diaphragm, etc.) are configured to deform under bending stress. The speakers can be configured produce sound waves in an undeformed state and in a deformed state. Deformation indicates a change in shape of the speakers, though shape will vary depending on a shape of a head of a user wearing the head support.

The head support can include a power unit disposed within the head support. The power unit can include a battery or other power source that stores energy for providing electrical power to the display unit, the speakers, and other electronics (not shown) of the head-mounted display, such as processors, sensors, transducers, and/or transceivers. In other implementations, the power unit may not include power storage, in which case, a power supply device can supply power for operating, but not charging, the head-mounted display.

Figure 5:
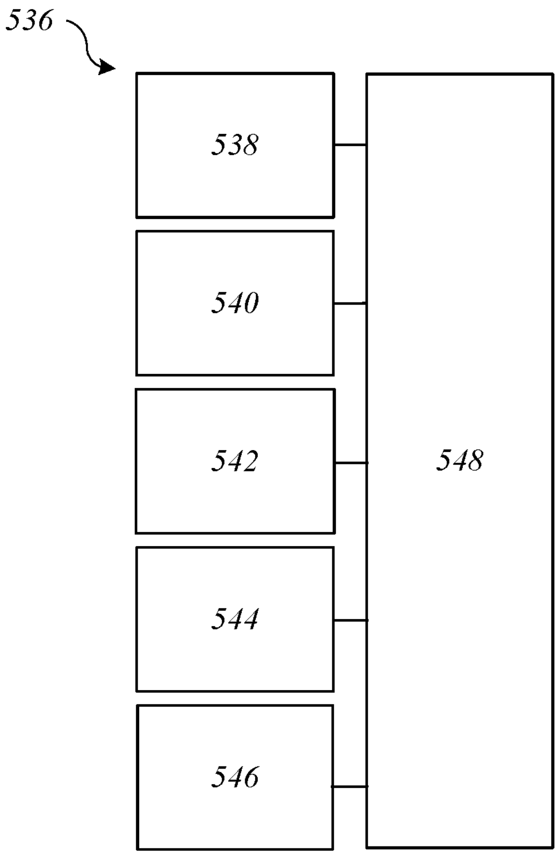
FIG. 5 is an illustration of a hardware configuration for a controller.

FIG. 5 shows an example of a hardware configuration for a controller 536 that may be used with the speakers 100, 200, 300, 400 of FIGS. 1A to 4B and/or other electronic components. In the illustrated example, the controller 536 includes a processor 538, a memory device 540, a storage device 542, one or more input devices 544, and one or more output devices 546. These components may be interconnected by hardware such as a bus 548 that allows communication between the components.

The processor 538 may be a conventional device such as a central processing unit and is operable to execute computer program instructions and perform operations described by the computer program instructions. The memory device 540 may be a volatile, high-speed, short-term information storage device such as a random-access memory module. The storage device 542 may be a non-volatile information storage device such as a hard drive or a solid-state drive.

The input devices 544 may include sensors and/or any type of human-machine interface, such as buttons, switches, a keyboard, a mouse, a touchscreen input device, a gestural input device, or an audio input device. The output devices 546 may include any type of device operable to project audio, send commands associated with an operating mode or state, or provide an indication to a user regarding an operating mode, state, or configuration, such as the speakers 100, 200, 300, 400 or a display unit of a head-mounted display.

In reference to head-mounted displays, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones, earphones, speaker arrays, input systems (e.g., wearable or handheld controllers with or without haptic feedback), smartphones, tablets, and desktop/laptop computers. A head-mounted system may have one or more speaker(s) and an integrated opaque display.

Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, such as from sensors or user profiles, to improve the function of systems such as the speakers 100, 200, 300, 400. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and exercise information), date of birth, or any other identifying or personal information.

The present disclosure recognizes that the use of personal information data, in the present technology, can be used to the benefit of users. For example, the personal information data can be used to deliver changes to operational modes or configurations of systems such as the speakers 100, 200, 300, 400 to best match user preferences or profiles. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of speakers, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes or configurations associated with a speaker can be implemented for a given user by inferring user preferences or user status based on non-personal information data, a bare minimum amount of personal information, other non-personal information available to the systems, or publicly available information.

What is claimed is:

1. A speaker for a head-mounted display, the speaker comprising:

a housing having walls that define a cavity;

an electromagnet disposed in the cavity and configured to selectively generate a first magnetic field;

a permanent magnet disposed in the cavity and configured to generate a second magnetic field; and a diaphragm configured to vibrate during an interaction between the first and second magnetic fields to produce sound waves, wherein the walls, the electromagnet, the permanent magnet, and the diaphragm are flexible and configured to deform together.

2. The speaker of claim 1, further comprising:

a reinforcement extending between the walls at a location in the cavity external to the electromagnet and the permanent magnet, wherein the reinforcement is configured to prohibit the walls, the electromagnet, the permanent magnet, and the diaphragm from contacting each other during deformation.

3. The speaker of claim 2, further comprising:

a back volume disposed between the walls at a location in the cavity external to the reinforcement.

4. The speaker of claim 3, wherein the reinforcement defines perforations configured to allow air to flow into and out of the back volume.

5. The speaker of claim 3, further comprising:

ribs disposed at spaced locations in the back volume, each rib extending from one wall toward another wall in an alternating manner, the ribs forming a circuitous flow path for air generated during vibration of the diaphragm.

6. The speaker of claim 1, further comprising:

a sensing system configured to detect a magnitude of deformation of at least one of the walls, the electromagnet, the permanent magnet, or the diaphragm.

7. The speaker of claim 6, wherein a magnitude of the first magnetic field is based on the magnitude of deformation detected with the sensing system.

8. The speaker of claim 6, wherein a pattern of current supplied to the electromagnet is modified based on the magnitude of deformation detected with the sensing system.

9. A speaker for a head-mounted display, the speaker comprising:

a housing having walls that define a cavity; and a diaphragm covering the cavity and configured to vibrate under application of a magnetic field, the vibration producing sound waves, wherein the walls are configured to deform under bending stress, and wherein the speaker is configured produce the sound waves both in an undeformed state and in a deformed state.

10. The speaker of claim 9, wherein the walls comprise wall sections, and wherein respective contiguous wall sections are coupled by hinges that are compressed in the deformed state and expanded in the undeformed state.

11. The speaker of claim 9, further comprising:

an electromagnet disposed in the cavity and configured to selectively generate the magnetic field; and a permanent magnet disposed in the cavity and configured to generate another magnetic field, wherein the diaphragm vibrates during interaction of the magnetic fields.

12. The speaker of claim 11, further comprising:

a sensing system configured to detect a magnitude of deformation of at least one of the walls.

13. The speaker of claim 12, wherein a pattern of current supplied to the electromagnet is modified based on the magnitude of deformation detected with the sensing system.

14. The speaker of claim 12, wherein a magnitude of the magnetic field selectively generated by the electromagnet is based on the magnitude of deformation detected with the sensing system.

15. The speaker of claim 9, further comprising:

a back volume disposed between the walls at a location external to the diaphragm.

16. The speaker of claim 15, further comprising:

ribs disposed at spaced locations in the back volume, each rib extending from one wall toward another wall in an alternating manner, the ribs forming a circuitous flow path for air generated during vibration of the diaphragm.

17. A head-mounted display, comprising:

a head support;

a speaker disposed in the head support, the speaker comprising:

a housing defining a cavity; and a diaphragm covering the cavity and configured to vibrate under application of a magnetic field, the vibration producing sound waves, wherein the head support and the housing of the speaker are configured to deform under bending stress, and wherein the speaker is configured to produce the sound waves both in an undeformed state and in a deformed state.

18. The head-mounted display of claim 17, further comprising:

an electromagnet disposed in the cavity and configured to selectively generate the magnetic field; and a permanent magnet disposed in the cavity and configured to generate another magnetic field, wherein the diaphragm vibrates during an interaction between the magnetic fields to produce the sound waves.

19. The head-mounted display of claim 18, further comprising:

a sensing system disposed in the head support, the sensing system configured to detect a magnitude of deformation of at least one of the housing of the speaker or the head support.

20. The head-mounted display of claim 19, wherein a pattern of current supplied to the electromagnet is modified based on the magnitude of deformation detected with the sensing system.

21. The head-mounted display of claim 19, wherein a magnitude of the magnetic field selectively generated by the electromagnet is based on the magnitude of deformation detected with the sensing system.

22. A speaker for a head support of a head-mounted display, the speaker comprising:

a cavity disposed within an interior of the head support;

an electromagnet disposed in the cavity and configured to selectively generate a first magnetic field;

a permanent magnet disposed in the cavity and configured to generate a second magnetic field; and a diaphragm configured to vibrate during an interaction between the first and second magnetic fields to produce sound waves, wherein the head support, the electromagnet, the permanent magnet, and the diaphragm are flexible and configured to deform together.

23. The speaker of claim 22, further comprising:

a sensing system configured to detect a magnitude of deformation of at least one of the head support, the electromagnet, the permanent magnet, or the diaphragm.

24. The speaker of claim 23, wherein a magnitude of the first magnetic field is based on the magnitude of deformation detected with the sensing system.

25. The speaker of claim 23, wherein a pattern of current supplied to the electromagnet is modified based on the magnitude of deformation detected with the sensing system.

* * * * *